United States Patent [19]

Westlake, III et al.

[11] Patent Number: 5,486,330
[45] Date of Patent: Jan. 23, 1996

[54] PROCESS FOR PRODUCING PLASTIC TUBING OF A SELECTED LENGTH, WALL THICKNESS AND INNER DIAMETER

[75] Inventors: Theodore N. Westlake, III; Duane K. Wolcott, both of Baton Rouge, La.

[73] Assignee: The Dow Chemical Company, Midland, Mich.

[21] Appl. No.: 176,596

[22] Filed: Jan. 3, 1994

[51] Int. Cl.$^6$ .................................................. B29C 55/22
[52] U.S. Cl. ............................................................ 264/291
[58] Field of Search ................................ 264/288.4, 291

[56] References Cited

U.S. PATENT DOCUMENTS

| | | | |
|---|---|---|---|
| 2,608,722 | 9/1952 | Stuetzer | 264/291 X |
| 4,212,204 | 7/1980 | St. Amand | 264/291 X |
| 4,944,180 | 7/1990 | Tou et al. | 73/38 |
| 5,317,932 | 6/1994 | Westlake, III et al. | 73/864.73 |

*Primary Examiner*—Leo B. Tentoni

[57] ABSTRACT

Process and apparatus for producing plastic membrane tubing of a selected length, wall thickness and inner diameter from a commercially-available tubing while retaining tubing end portions which are readily connected by conventional tubing connections to the tubing leads for an associated analytical apparatus, involving a controlled heating and a rapid stretching of the heated tubing by fixing a first end of the tubing and application of a constant tensile force to a second end of the tubing to stretch the tubing a desired amount.

1 Claim, 3 Drawing Sheets

PROCESS FOR PRODUCING PLASTIC TUBING OF A SELECTED LENGTH, WALL THICKNESS AND INNER DIAMETER

The present invention relates to the use of plastic permeation or diffusion membrane tubing in devices of the type described, for example, in U.S. Pat. No. 4,944,180 to Tou et al., or especially as described in an international patent application published as WO 93/16790 under the Patent Cooperation Treaty and corresponding generally to United States patent application Ser. No. 07/843,687 (hereafter, the '687 application), filed Feb. 28, 1992 for "Sample Probe" and now issued as U.S. Pat. No. 5,317,932 (with such United States application being incorporated herein by reference).

One of the difficulties which has been encountered in these uses, and most especially for the analytical or fluids separation uses described in the aforementioned '687 application, has been the relatively small number of tubing sizes which are commercially-available. Those skilled in the art will readily recognize the limitations placed thereby on the overall utility of devices of the sort described in the '687 application, and the corresponding value of being able to select a desired tubing length, wall thickness and inner diameter for any given separation and for any given tubular membrane-based fluid separations device of the type shown therein.

The present invention thus provides an apparatus and process for manufacturing, from commercially-available plastic permeation or diffusion membrane tubing which is otherwise suitable for use in a device of the type described in the '687 application, a tubular membrane of a selected length, wall thickness and inner diameter but which retains end portions of the original wall thickness and inner diameter, so that the membrane end portions may be coupled by conventional tubing connections to a tubing lead from an associated analytical apparatus (e.g., a liquid or a gas chromatograph) and to a source of a carrier gas or liquid for flowing through the lumens of the membrane and carrying materials permeating or diffusing through the membrane wall to the analytical apparatus. In brief, this is accomplished by inserting a length of membrane support tubing into the lumens of a selected commercially-available plastic tubing at each of its (i.e., the commercially-available plastic tubing's) ends, heating the plastic tubing above its glass transition temperature, and stretching the tubing in a controlled manner by fixing one end of the tubing and applying a constant tensile force to the second end of the tubing until a desired degree of elongation is achieved.

BRIEF DESCRIPTION OF THE DRAWINGS

A fuller understanding of the process and apparatus of the present invention may be obtained from an examination of the accompanying drawings and from the following detailed description of these drawings, in which.

DESCRIPTION OF THE PREFERRED EMBODIMENT

Figure 1:
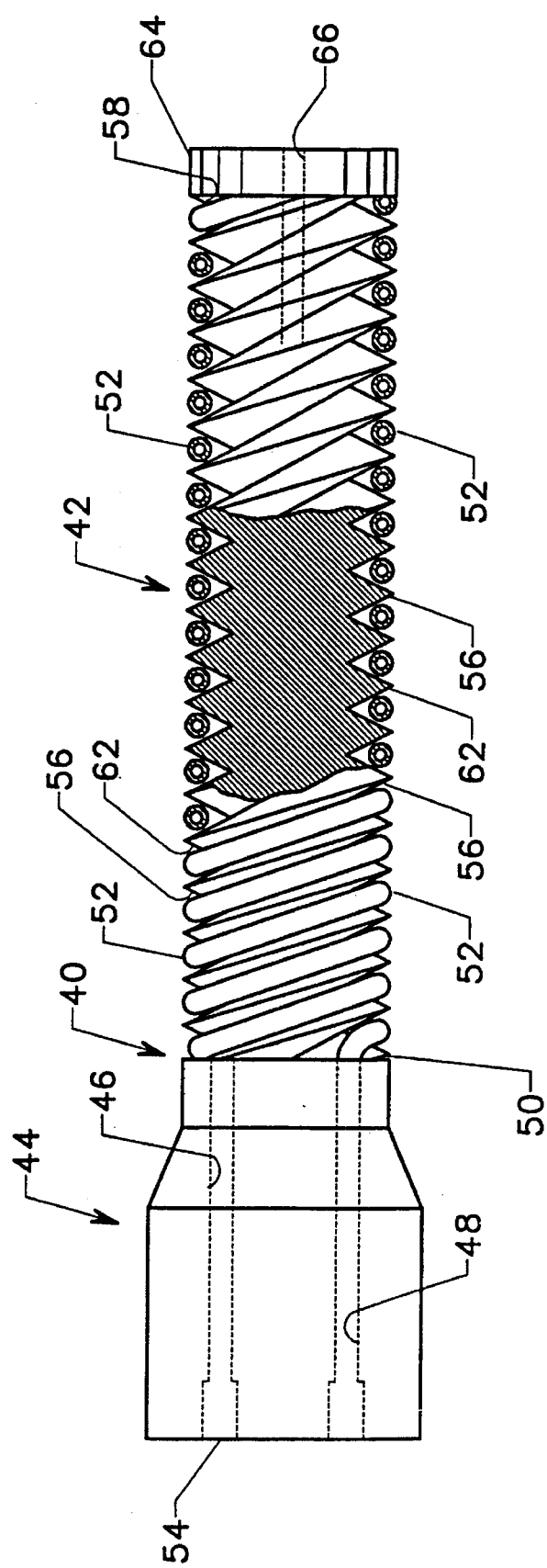
FIG. 1 reproduces (in pertinent part) FIG. 5 of the '687 application and illustrates a grooved tubular membrane support member and tubular membrane of a type described in such application.
Figure 2:
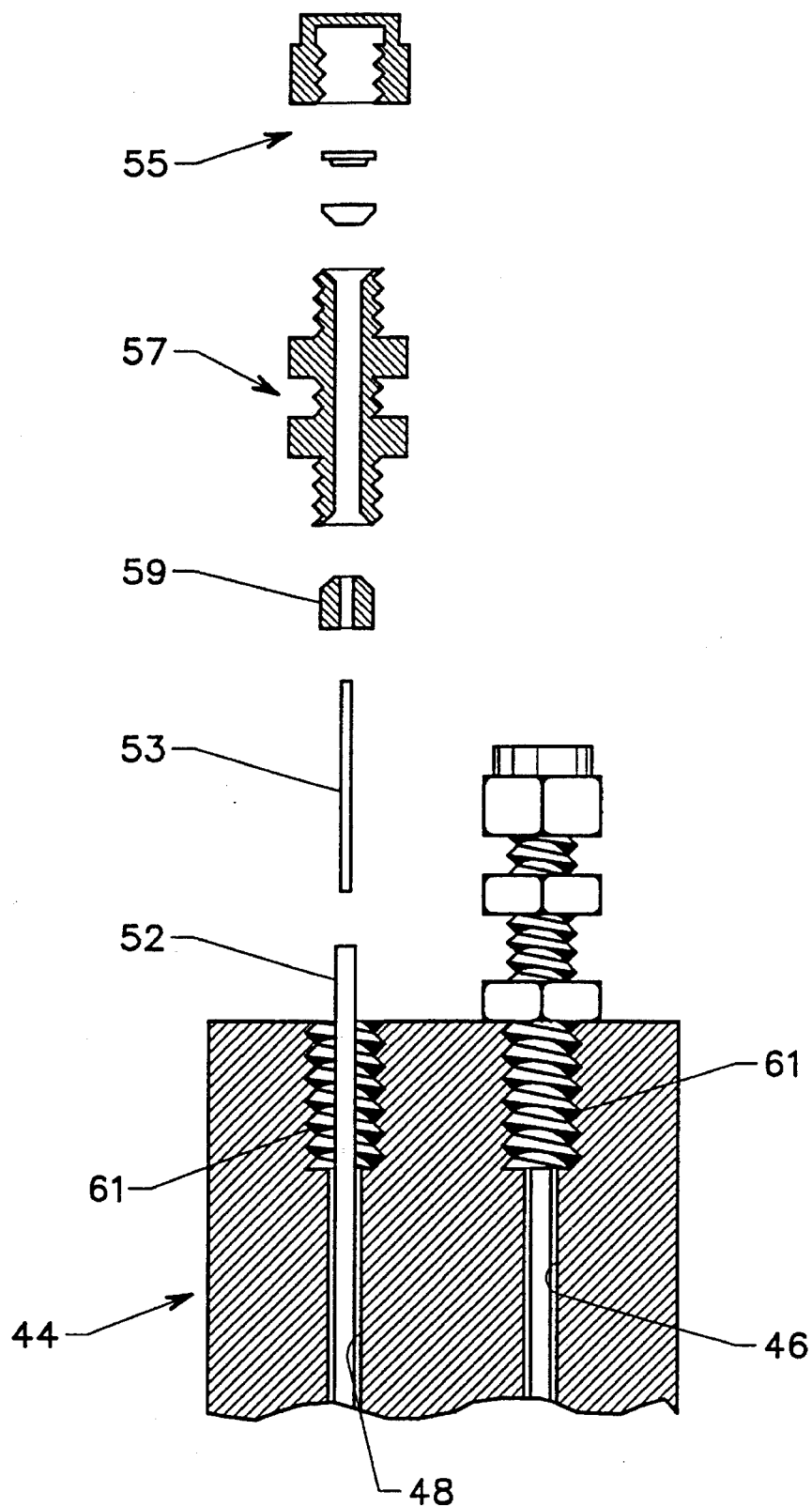
FIG. 2 reproduces FIG. 10 of the '687 application and shows a preferred manner of joining the membrane (at its ends) in fluid communication with a source of a carrier gas or liquid and with the tubing lead from a gas or liquid chromatograph.

Referring now to the drawings, and more particularly to FIGS. 1 and 2, a grooved membrane support member 40 is shown having a double-lead flight threaded portion 42 and an unthreaded portion 44. Two channels 46 and 48 are defined longitudinally through the unthreaded portion 44, and emerge at a shoulder 50 of the unthreaded portion 44 in position to receive from or transmit to a helical flight of the adjacent threaded portion 42 a membrane 52 supported therein. Short, curving transition channels (not shown) are preferably provided in the surface of the unthreaded portion 44 adjacent the shoulder 50 for easing the transition of the membrane 52 between the channels 46 and 48 and the flights of the threaded portion 42.

The ends of the membrane 52 in channels 46 and 48 are joined in fluid communication with a source of a carrier gas or liquid (not shown) and with a gas or liquid chromatograph (or other analytical device, also not shown), respectively, in the manner illustrated in FIG. 2.

One end of a length of membrane support tubing 53 is inserted into and holds open the lumens of membrane tubing 52, the membrane support tubing 53 being made of, for example, stainless steel or silica glass.

Membrane support tubing 53 is in turn securely joined via a two ferrule compression-type fitting 55 to a conventional tubing lead (not shown, and comprised of, e.g., stainless steel or nickel) to the gas or liquid chromatograph. A compression-type tube-to-tube bulkhead fitting 57 ties the assembly 55 and a membrane sealing ferrule into an integrated whole, with the fitting 57 being joined to the support member 40 by the threaded engagement of fitting 57 with a threaded portion 61 of a channel 46 or 48 in the unthreaded portion 44 of support member 40.

The membrane tubing 52 associated in use with the support member 40 thus enters the unthreaded portion 44 through channel 46 from a second end 54 of the member 40 and from a source of the carrier gas or liquid to be employed in membrane 52.

As shown in FIG. 1, the membrane 52 is then wrapped around the support member 40 through alternating flights 56 in threaded portion 42, toward a first end 58 of the support member 40. At the first end 58, then membrane 52 traverses an S-shaped channel (not shown) in the first end 58 of the support member 40 which joins the alternating helical return flights 62 in communication with the flights 56. The membrane 52 in traversing flights 62 thus is wrapped around the member 40 through those alternating flights which had been "skipped" in going from the second end 54 of the member 40 to the first end 58 of the member 40. The membrane 52 then returns to and is received by the channel 48 in the unthreaded portion 44 of the support member 40, to be connected to a gas or liquid chromatograph via the FIG. 2 arrangement.

A protective cap 64 is placed over the S-shaped channel in the first end 58 to retain and protect the membrane 52 in the S-shaped channel, and is conventionally joined to the support member 40 by bolts or screws placed through holes 66 in the cap 64 and corresponding holes 68 in the first end 58 of support member 40.

The use of a threaded portion 42 on a support member 40 to support the membrane 52 permits a longer, thinner-walled membrane 52 to be employed than would be possible were it necessary for the membrane 52 to be self-supporting or were the membrane 52 supported on support member 40 in some other fashion. The improvements to be realized therefrom, however, have been limited by the availability of thin-walled tubing with a sufficient outer diameter to permit the necessary fluid connections to be made to the tubing leads from a gas or liquid chromatograph and from a source of a carrier gas or liquid.

The apparatus of the present invention, as summarized previously, enables a tubular membrane to be made of a selected length, wall thickness and inner diameter, while retaining end portions of the original wall thickness and inner diameter, so that the membrane end portions may be coupled by conventional tubing connections to a tubing lead from an associated analytical apparatus (e.g., a liquid or a gas chromatograph) and to a source of a carrier gas or liquid.

Figure 3:
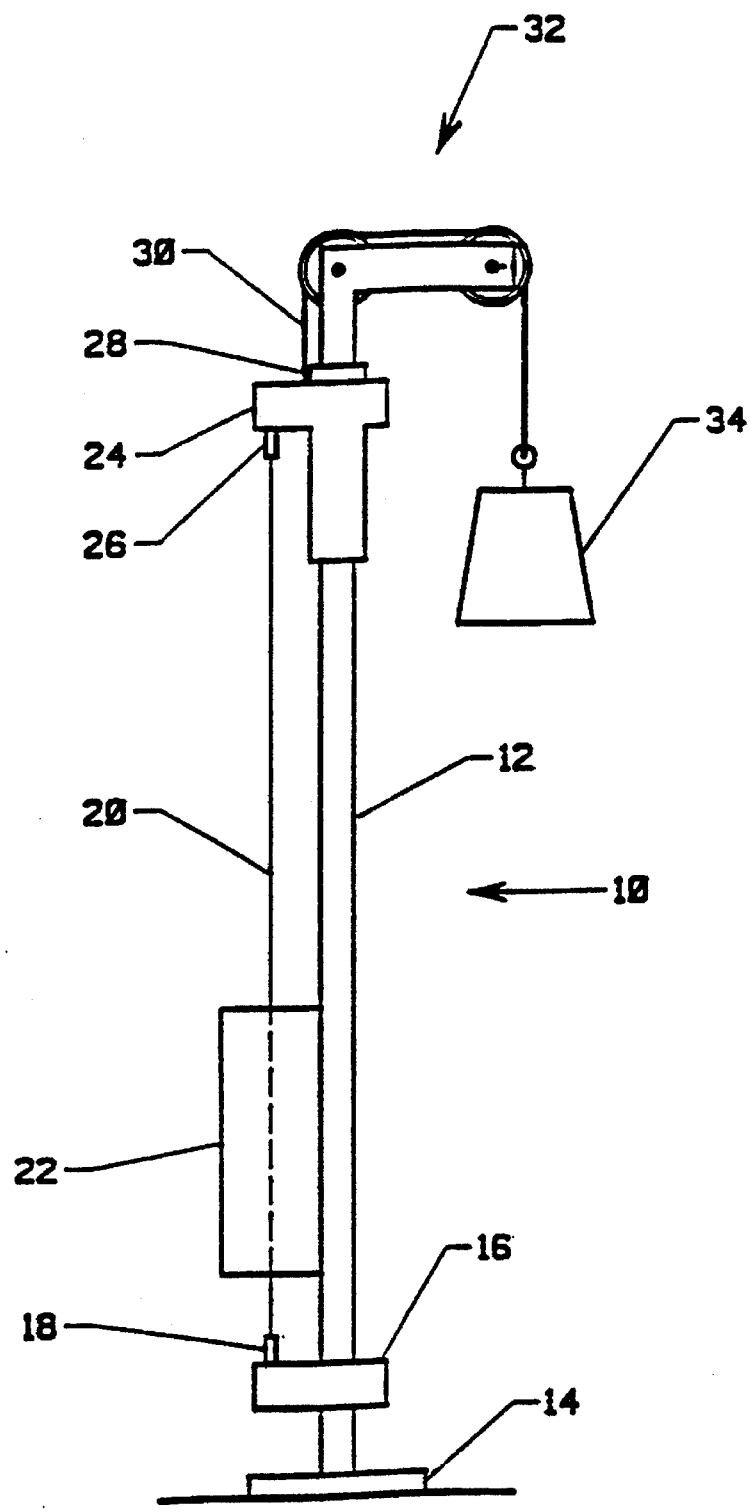
FIG. 3 illustrates a preferred apparatus of the present invention.

A preferred embodiment 10 of the apparatus of the present invention is shown in FIG. 3, and comprises a vertical shaft 12 which is supported on a base 14. A fixed block 16 is positioned on the shaft 12 adjacent the base 14, and carries a clip 18 for holding one end of a segment 20 of plastic membrane tubing into which has been inserted a length of stainless steel membrane support tubing 53. A means is provided for heating the plastic membrane tubing above its glass transition temperature, preferably in the form of furnace 22. Furnace 22 is Carried on the shaft 12 just above the block 16 and clip 18, for heating substantially the entire beginning length of the segment 20 above the glass transition temperature ($T_g$) of the plastic material from which the segment 20 is constructed.

A slidable block 24 is positioned on the shaft 12 above the furnace 20, and carries a clip 26 for holding the second end of the segment 20 of plastic membrane tubing (a length of stainless steel membrane support tubing 53 having also been inserted into this second end of segment 20). A stop block 28 is positioned on the shaft 12 above the slidable block 24, for limiting the upward movement of the block 24 on shaft 12. The stop block 28 is movable up and down to adjust the degree of stretching of the segment 20 in the apparatus 10, but can be locked or fixed in a desired position on shaft 12.

A wire 30 is attached directly at one end to the stop block 28, and through a set of pulleys 32 is attached at its other end to a weight 34 which exerts a constant tensile force on the stop block 28, and on the heated segment 20 of membrane tubing held between blocks 16 and 28.

Those skilled in the art will appreciate that through the apparatus 10, a controlled rapid heating and stretching of the segment 20 can be accomplished to achieve a membrane 52 of a desired length, with the membrane 52 thereafter being cooled and then applied to a device as illustrated in FIGS. 1 and 2.

The resulting membrane 52 can be characterized as having first and second end portions which are of the wall thickness and inner diameter of the beginning segment 20 of commercially-available membrane tubing, so that the membrane 52 can be readily coupled (as described above) by conventional tubing connections to a tubing lead from an associated gas or liquid chromatograph and to a source of a carrier gas or liquid. The membrane 52 tapers from these end portions to a uniform wall thickness and inner diameter, as determined by the wall thickness and inner diameter of the segment 20 and the amount of stretching performed on the segment 20 by the apparatus 10.

A preferred embodiment of the apparatus of the present invention has been described which is simple of construction, however it is apparent that numerous other embodiments could be constructed given the principles described herein which are still within the scope and spirit of the present invention, as more particularly defined by the claims below.

What is claimed is:

1. A process for producing plastic permeation or diffusion membrane tubing of a selected length, wall thickness and inner diameter, comprising the steps of:

selecting a commercially-available tubing which when stretched to such a selected length will provide tubing of the selected wall thickness and inner diameter;

inserting a length of a membrane support tubing into the lumens of the selected commercially-available plastic tubing at each of the commercially-available plastic tubing's ends, so that overlying, supported end portions of the commercially-available plastic tubing are preserved in an original wall thickness and inner diameter as the tubing is stretched;

heating the plastic tubing above its glass transition temperature over substantially all of the commercially-available plastic tubing's length; and rapidly stretching the heated tubing by fixing one end of the tubing and applying a constant tensile force to a second end of the tubing until the tubing is of the selected length.

\* \* \* \* \*